(12) United States Patent
Kroll et al.

(10) Patent No.: US 9,746,684 B2
(45) Date of Patent: *Aug. 29, 2017

(54) COMBINED LIGHT MODULATION DEVICE FOR TRACKING USERS

(71) Applicant: SEEREAL TECHNOLOGIES S.A., Munsbach (LU)

(72) Inventors: Bo Kroll, London (GB); Gerald Futterer, Dresden (DE); Norbert Leister, Dresden (DE); Stephan Reichelt, Dresden (DE); Ralf Haussler, Dresden (DE)

(73) Assignee: SEEREAL TECHNOLOGIES S.A., Munsbach (LU)

( * ) Notice: Subject to any disclaimer, the term of this patent is extended or adjusted under 35 U.S.C. 154(b) by 0 days.

This patent is subject to a terminal disclaimer.

(21) Appl. No.: 15/075,870

(22) Filed: Mar. 21, 2016

(65) Prior Publication Data

US 2016/0202593 A1    Jul. 14, 2016

Related U.S. Application Data

(63) Continuation of application No. 13/997,395, filed as application No. PCT/EP2011/073533 on Dec. 21, 2011, now Pat. No. 9,291,828.

(30) Foreign Application Priority Data

Dec. 22, 2010  (DE) .................. 10 2010 063 998
Mar. 4, 2011   (DE) .................. 10 2011 005 154

(51) Int. Cl.
G02B 27/22    (2006.01)
H04N 13/04    (2006.01)
(Continued)

(52) U.S. Cl.
CPC ......... *G02B 27/22* (2013.01); *G02B 27/0093* (2013.01); *G02B 27/225* (2013.01);
(Continued)

(58) Field of Classification Search
CPC ................ G02B 27/22; G02B 27/2214; G02B 27/0093; G02B 27/225; H04N 13/0404; H04N 13/0409; H04N 13/0468
See application file for complete search history.

(56) References Cited

U.S. PATENT DOCUMENTS 3,872,348 A   3/1975  Astley
3,980,389 A   9/1976  Huignard et al.
(Continued)

FOREIGN PATENT DOCUMENTS

DE   197 00 162 A1   7/1998
DE   197 04 740 A1   8/1998
(Continued)

OTHER PUBLICATIONS

International Search Report, dated Mar. 28, 2012, and Written Opinion, issued in International Application No. PCT/EP2011/073533 (in both German and English).

*Primary Examiner* — Dung Nguyen
(74) *Attorney, Agent, or Firm* — Saul Ewing LLP (57) ABSTRACT

For comfortable viewing of a 3-D scene at various viewing angles, a display having a large tracking range for a variable viewer distance is required. A controllable light-influencing element deflects light in coarse steps in a viewer range. Within said steps, the light is deflected by a further controllable light-influencing element continuously or with fine gradation. The light modulation device is suitable in holographic or autostereoscopic displays for guiding the visibility ranges of the image information to be displayed so as to follow the eyes of the viewers.

20 Claims, 6 Drawing Sheets

(51) Int. Cl.
    *G02B 27/00*     (2006.01)
    *G03H 1/02*     (2006.01)
    *G02B 5/32*     (2006.01)
    *G02B 26/08*     (2006.01)
    *G02F 1/29*     (2006.01)
    *G03H 1/22*     (2006.01)
    *G03H 1/26*     (2006.01)
    *G02F 1/13*     (2006.01)

(52) U.S. Cl.
    CPC ........... *G02B 27/2214* (2013.01); *G03H 1/02* (2013.01); *G03H 1/2294* (2013.01); *H04N 13/0404* (2013.01); *H04N 13/0409* (2013.01); *H04N 13/0418* (2013.01); *H04N 13/0468* (2013.01); *G02B 5/32* (2013.01); *G02B 26/08* (2013.01); *G02F 1/1313* (2013.01); *G02F 1/292* (2013.01); *G03H 1/22* (2013.01); *G03H 1/2205* (2013.01); *G03H 1/265* (2013.01); *G03H 1/2645* (2013.01); *G03H 2001/0212* (2013.01); *G03H 2001/221* (2013.01); *G03H 2001/2223* (2013.01); *G03H 2001/2236* (2013.01); *G03H 2001/2242* (2013.01); *G03H 2001/2292* (2013.01); *G03H 2001/266* (2013.01); *G03H 2001/2655* (2013.01); *G03H 2222/34* (2013.01); *G03H 2222/36* (2013.01); *G03H 2225/33* (2013.01); *G03H 2226/05* (2013.01); *H04N 13/042* (2013.01)

(56) References Cited

U.S. PATENT DOCUMENTS

| | | | |
|---|---|---|---|
| 4,627,039 A | 12/1986 | Meyer | |
| 5,576,880 A | 11/1996 | Chang | |
| 6,188,462 B1 | 2/2001 | Lavrentovich et al. | |
| 6,473,209 B1 | 10/2002 | Popovich | |
| 9,291,828 B2 * | 3/2016 | Kroll | G03H 1/22 |
| 2007/0035809 A1 | 2/2007 | Maram et al. | |
| 2010/0157026 A1 | 6/2010 | Reichelt | |
| 2010/0271676 A1 | 10/2010 | Renaud-Goud | |

FOREIGN PATENT DOCUMENTS

| | | |
|---|---|---|
| DE | 100 53 880 A1 | 8/2001 |
| DE | 103 53 439 A1 | 6/2004 |
| DE | 602 12 398 T2 | 5/2007 |
| DE | 10 2006 004 300 A2 | 8/2007 |
| DE | 10 2006 043 297 A1 | 3/2008 |
| DE | 10 2007 019 277 A1 | 10/2008 |
| DE | 10 2007 051 521 A1 | 4/2009 |
| DE | 10 2008 054 438 A1 | 6/2010 |
| DE | 10 2009 044 910 A1 | 12/2010 |
| DE | 10 2009 028 626 A1 | 1/2011 |
| EP | 0 769 881 A2 | 4/1997 |
| EP | 1 579 249 | 9/2005 |
| EP | 2 160 658 B1 | 1/2011 |
| WO | 03/015424 A2 | 2/2003 |
| WO | 2004/051323 A1 | 6/2004 |
| WO | 2007/007285 A2 | 1/2007 |
| WO | 2008/130561 A1 | 10/2008 |
| WO | 2008/142156 A2 | 11/2008 |
| WO | 2010/084326 A2 | 7/2010 |

* cited by examiner

COMBINED LIGHT MODULATION DEVICE FOR TRACKING USERS

CROSS REFERENCE TO RELATED APPLICATIONS

This application is a continuation of U.S. application Ser. No. 13/997,395, filed Sep. 16, 2013, which claims the priority of PCT/EP2011/073533, filed on Dec. 21, 2011, which claims priority to German Application No. 10 2010 063 998.2, filed Dec. 22, 2010 and German Application No. 10 2011 005 154.6, filed Mar. 4, 2011, the entire contents of each of which are hereby incorporated in total by reference.

BACKGROUND OF THE INVENTION

The present invention relates to a combined light modulator device for a holographic or an autostereoscopic display with observer tracking. In the context of the present invention, a combined light modulator device is understood to be a device which changes in a multi-stage process the properties and/or the direction of light which is emitted by one or multiple real or virtual light sources.

Here, a virtual light source is a light source which is only seemingly situated at a certain position, i.e. a light source which appears to be there as a result of manipulating light of a real light source by—typically static—imaging means, such as, for example, a mirror and/or beam confining means such as apertures.

In the context of this patent application, a holographic display is a display device for three-dimensional image data where the three-dimensional object data of the scene to be represented are encoded in the form of diffraction patterns of the scene to be reconstructed. The reconstruction of a three-dimensional scene in a large visibility region at high quality requires both great computing power and a high-resolution light modulator.

In document DE 103 53 439 B4, the entire contents of which being fully incorporated herein by reference, the applicant has thus proposed a method in which the wave front is only computed for a small visibility region whose diameter is only little larger than the diameter of an eye pupil of an observer eye. Consequently, each of the object points to be reconstructed only needs to be encoded in a small region of the light modulator in particular sub-holograms.

For this, sufficiently coherent light, which is emitted by at least one light source, illuminates at least one light modulator and is imaged to at least one observer eye by a field lens. The reconstruction of the three-dimensional scene for the other observer eye can be generated by alternately switching on at least one other light source in synchronism with the light modulator while writing a corresponding hologram or corresponding sub-holograms to the light modulator. Here, colour representation is possible by way of spatial or temporal interleaving (space or time division multiplexing) of the hologram information for each colour component. To enable the observer to move freely in front of the display, the focal regions are tracked to the observer eyes by switching on further light sources separately. For this, the coordinates of the eyes of one or multiple observers are continuously determined with the help of a position detection system.

Here, the reconstruction of the scene can be adapted to the new observer position by recalculating of the diffraction pattern. It is also possible to provide reconstructions for multiple observers by way of temporal interleaving (time division multiplexing).

To provide observer tracking along the optical path, the focal plane of the focusing unit, and thus the size of the visibility region, is preferablly additionally adapted to the eye positions of the observers.

In an autostereoscopic display (ASD) with observer tracking, it is not diffraction patterns that are encoded on the light modulator, but rather are the scene views for the particular eye written directly.

Observer tracking can be realised by way of direct or indirect displacement of the light sources. A known example of indirect displacement are deflection mirrors.

Numerous other methods of observer tracking are known. Observer tracking can be achieved, for example, by modifying the optical path in front of or behind the light modulator which is used for hologram encoding or for stereo representation. In addition to mechanical methods, methods of changing reflective, diffractive or refractive properties using adaptive optical systems are known.

Further, it is known to use combined tracking methods, i.e. methods which take advantage of a light-deflecting function that is static but varies across the surface area of the light-deflecting means.

In the patent application DE 10 2008 054 438 A 1 filed by the applicant, a matrix of electrically controllable fluid cells is proposed for observer tracking with the fluid cells having additional static light-deflecting means which, however, vary across the surface area of the matrix in order to realise or at least to support the function of a field lens. These light-deflecting means can, for example, comprise refractive elements, such as prisms or lenses, or diffractive elements, such as volume gratings or blazed gratings, i.e. gratings which are optimised for a certain wavelength.

The patent application DE 10 2009 028 626 A 1 filed by the applicant, the entire contents of which being fully incorporated herein by reference, teaches to use controllable diffractive gratings for observer tracking.

Here, multiple gratings of this kind with the same direction of deflection can also be arranged one after another in order to realise a larger deflection angle. Here, it is also possible to arrange at least two controllable deflection gratings one after another which are turned to one another by a fixed angle in order to achieve a two-dimensional deflection. By varying the written grating period, the diffractive gratings can realise a locally different deflection across the surface area of the deflection unit in order to realise or at least to support the function of a field lens.

In a controllable deflection grating whose grating period is variable so to set a desired diffraction angle, there is a minimum settable period due to the spatial resolution with which the deflection grating can be controlled. If the period is set, for example, using a grid-like electrode structure, there are limitations to the width and distance of the electrodes caused by the manufacturing process. In addition, electric stray fields or diffusing or diffractive components of the deflection grating, for example, cause cross-talking among set neighbouring phase values. They can also reduce the diffraction efficiency and thus cause the occurrence disturbing diffused light or light in higher diffraction orders.

Since in a grid-shaped diffractive structure the diffraction angle is inversely proportional to the periodicity of the diffractive structure, the available angular range and thus the tracking range of a single diffraction device is limited by the producible electrode pitch.

However, to be able to watch a 30 scene comfortably at various viewing angles, a display is required to have a large tracking range at a variable observer distance. A solution is thus sought which, the limited diffraction angle of a deflection element notwithstanding, provides a tracking range which is larger than that achievable with such element.

SUMMARY OF THE INVENTION

This object is solved according to this invention by the features of claim 1.

A light modulator device for a holographic or an autostereoscopic display for the representation of three-dimensional image information with at least one real or virtual light source, at least one light modulator to which is written encoded image information of the image to be represented to at least one observer eye of at least one observer, a first and a second light-affecting means for changing the optical path of the light which is emitted by the light source, an eye position detection system for finding and following at least one eye position of the at least one observer of the image information and a system controller for tracking at least one visibility region of the image information based on the eye position information provided by the eye position detection system using the first and second light-affecting means is characterised by a first light-affecting means, which tracks the visibility region to the eyes of the observer in large steps within the observer range, and by a second light-affecting means, which tracks the visibility region to the eyes of the observer finely graduated or continuously at least within one such large step of the first light-affecting means with the help of at least one electrically controllable diffraction grating.

Here, the system controller chooses that direction of deflection of the first light-affecting means which comes closest to the currently selected eye position of the selected observer and sets it in the first light-affecting means. The differential angle between this deflection angle and the actually selected eye position is simultaneously or promptly computed by the system controller and set in the second light-affecting means.

Both eyes of a selected observer can be served by the system controller by way of time division multiplexing, where the eye position detection system provides the eye position information needed for this.

For a 3D representation, the image content to be represented, i.e. the particular stereo view or the encoded hologram, is adapted to the respective right or left eye by the system controller for this. The eye position detection system can also be designed such that it additionally serves as a system for detecting the viewing angle so to be able to reconstruct, for example, only those parts of a scene which the observer actually looks at in a system with a large total viewing angle.

Multiple observers can also be served by way of time division multiplexing, which requires fast light modulators and fast light-affecting means though.

Here, a refresh rate of at least 60 frames per second is required for each view in the time division multiplex mode to provide a non-flickering representation. If both the three colour components and the two eyes of each observer are served by way of time division multiplexing, this refresh rate relates to each view of one colour channel for one eye of one observer.

In particular in a projection system it is possible to use a separate deflection system for each observer eye, which allows simultaneous representation of image contents for both observer eyes through a beam combining system.

It is possible by adapting the image content to be represented to the actual observer position through the system controller that the observer seemingly moves around the image contents to be represented when he moves his head within the visibility region of the display, where this effect can also be exaggerated or reduced artificially.

Since it is very complicated to make achromatic diffractive beam deflecting elements, a colour representation is also realised by way of time division multiplexing of the individual colour components in a preferred embodiment.

Depending on the actual physical form of the light modulator device, the second light-affecting means with the controllable light-deflecting gratings can be disposed in front of or behind the first light-affecting means for rough light deflection. A light-affecting means for rough light deflection, which requires fixed angles of incidence to ensure proper function, such as, for example, volume gratings for diffractive beam deflection, is preferably arranged in front of the second light-affecting means.

One or both of the light-affecting means can be disposed in front of or behind the light modulator.

They can be designed to be used in conjunction with a transmissive, emissive or reflective light modulator.

A transmissive or reflective light modulator is used in conjunction with an illumination device, where the latter typically emits collimated light with which the light modulator is illuminated.

Examples of transmissive light modulators are liquid crystal modulators on a transparent substrate with a multitude of controllable liquid crystal cells which are arranged in rows and columns or modulators which are based on electrowetting cells.

Suitable reflective modulators include, for example, liquid crystal modulators on a reflective substrate (e.g. LCoS—liquid crystal on silicon) or micro-mirror arrays (e.g. DMD-digital micro-mirror device) as fast light modulators.

With a transmissive or reflective light modulator, the first and/or the second light-affecting means or parts thereof can be integrated into the illumination device.

If the light modulator is, for example, a phase-modulating light modulator where complex hologram values are encoded in two (two-phase encoding) or more phase pixels of the light modulator and where the associated phase values are thereafter combined by a beam combiner to form an intensity value with defined amplitude and phase value, then both light-affecting means are preferably arranged behind the light modulator if the beam combiner requires a defined direction of passage of the pencils of light.

Such a beam combiner is proposed, for example, in the hitherto unpublished German patent application DE 10 2009 044 910.8, the entire contents of which being fully incorporated herein by reference.

In an autostereoscopic display with a largely direction-independent amplitude-modulating light modulator or in a holographic display with a largely direction-independent complex-valued light modulator, it can be preferred, however, to integrate one or both light-affecting means wholly or partly into the illumination device of the light modulator.

Remaining direction-specific intensity dependencies can preferably be allowed for by the system controller when encoding the image information, so that these dependencies can be compensated.

Emissive light modulators, such as electroluminescence displays or plasma displays do not require an illumination device, because they actively serve as a light source themselves. Since their individual pixels are mutually incoherent, they are preferably used as light modulators in autostereoscopic displays.

In holographic displays, they may be used as a switchable light source combined with a collimation unit of the illumination device of a transmissive display, if the size of a pixel is small enough to exhibit a sufficient coherence length.

The two light-affecting means are controlled by the system controller such to direct the beams which are emitted by the light sources such that the currently represented information for a particular observer eye lies in the viewing range of that eye.

Here, depending on the physical form and type of encoding, the optical path may be affected in the horizontal direction only or both in the horizontal and vertical direction.

Tracking the visibility region in the horizontal direction only greatly contributes to the simplicity of the arrangement, because light-affecting means which can only change the optical path in one direction suffice.

In a holographic display, the computing power needed for hologram computing is substantially reduced when using one-dimensional encoding methods compared with two-dimensional encoding methods.

In one-dimensional observer tracking, it is possible to use real or virtual line light sources. They can, for example, be columns of an emissive display combined with an upstream collimation unit in the form of cylindrical lens arrays. In autostereoscopic displays, it is common to realise horizontal observer tracking only.

By changing the position of a real or virtual light source in front of a collimation unit in the horizontal or vertical direction, the direction of the collimated illuminating pencil of light can be changed in the horizontal or vertical direction. This can be done, for example, by switching on or controlling the brightness of individual light points or light point clusters of a high-resolution matrix of light sources in conjunction with an upstream array of collimation elements, for example a lens array.

For one-dimensional deflection, it is possible to use illuminating stripes in conjunction with an array of cylindrical lenses.

A deflection of the light points or light stripes can also be realised by mechanical or scanning methods.

The size of the light spot in the observer plane can be adjusted by shifting the light sources in the direction of the optical axis of the corresponding collimation unit. This can also be achieved by a collimation unit whose refractive power is variable and can thus be controlled accordingly.

A light-affecting means which comprises a light source array with displaceable light sources and a corresponding collimation unit can at the same time serve as a part of the illumination device that is used in conjunction with a transmissive light modulator.

Aberrations in the optical system can be compensated by controlling the brightness of individual light source points.

If individual light points of the controllable light source array have a clear distance to each other, then the visibility region can be tracked in large steps with them. The mean deflection angle a of a light source which is situated at a distance l to the object-side principal plane and at a distance a to the optical axis of the collimation unit is here $\alpha=\arctan(a/l)$.

The centre ray of a light source which is situated 10 mm in front of the object-side principal plane of the collimation unit and which bas a lateral offset of 2 mm to its optical axis has an inclination of 11.3 degrees relative to the optical axis.

As has already been shown above, a light-affecting means can be made up of multiple components. The first and/or the second light-affecting means of the light modulator device can be composed of multiple light-affecting elements with which the beam direction and/or the position of the real or virtual light sources are changeable independently of each other.

Multiple electrically controllable deflection gratings with same direction of deflection can thus wholly or partly be connected in series in order to extend the maximum achievable deflection angle or to realise a separate deflection range. To achieve a two-dimensional deflection, one-dimensionally working light-affecting elements can be combined so to form a light-affecting means. This can for example be done in the form of a crossed arrangement.

Here, the individual light-affecting elements of a light-affecting means can also be based on different physical principles.

The system controller considers the deflection properties of each individual element, so that it is possible to compensate aberrations which occur in one element in one or more other elements.

By varying the extent of the position change of the light of the light source and/or the extent of the beam direction change in the first and/or second light-affecting means depending on the point of incidence of the light on the surface area of the light-affecting means, the function of a field lens can be realised to adjust the size of the visibility region in the observer plane, or the effect of a separate field lens can be modified.

By way of controlling this position or beam direction change across the surface of one or multiple light-affecting means through the system controller, the size of the visibility region can be changed variably and thus, for example, be adapted to a changed observer distance from the display, so that the visibility region stays larger than the diameter of the eye pupil but smaller than the eye separation.

For this, the system controller analyses the position and distance information which is provided by the eye position detection system and sets the computed changes in the deflection angles in the corresponding light-affecting means in addition to the lateral angles which define the position of the visibility region in the observer plane.

The change in the beam direction in the light-affecting means for rough tracking of the visibility region can comprise both diffractive and refractive light-affecting elements.

In an embodiment with static light source array, the individual lenses of the collimation unit have a controllable lens effect so that the focal length and/or the lateral position of the lens vertex can be modified. Such a controllable lens based on an electrowetting cell has been disclosed, for example, in the European patent EP 1579249 B1, the entire contents of which being fully incorporated herein by reference.

For beam deflection in large steps, volume gratings to which at least two holograms are written can preferably be used in the first light-affecting means. The required volume grating or a master grating for further copies can be made by way of writing the holograms with the desired entrance and exit distributions with the particular working wavelength. The holograms can also be written in an optical system which is substantially identical to the application system or which is included in the latter (in-situ exposure) in order to compensate aberrations of involved optical components as much as possible.

Volume gratings can be optimised for very narrow angles of incidence which only differ slightly from one another and/or for narrow wavelength ranges. Very high diffraction efficiencies of near 100% can be achieved with this set-up for phase holograms. Here, the volume gratings serve as angle filters, i.e. only the light of a small angular range is diffracted to the desired direction, and/or as a wavelength filters, where only light of a selected wavelength range is diffracted to the desired direction. Light of other angles or wavelengths is transmitted through the volume grating without being diffracted.

The Bragg condition must be satisfied and the refractive index modulation must be chosen accordingly in order to make sure that only one diffraction order, i.e. for example the first, the second or a higher diffraction order, occurs when light passes through the volume grating. If the refractive index modulation deviates from the optimum, then there will be a non-diffracted portion, i.e. a zeroth diffraction order, even if the Bragg condition is fulfilled.

Depending on the thickness of the volume grating and the maximum possible refractive index difference, it may here be necessary to illuminate the grating such that multiple beam interference occurs, i.e. that enough grating layers are passed by the individual light beams. This means that the minimum generated diffraction angle is not too small, that it is 30 degrees, for example. This can be achieved by illuminating the volume grating at an angle. A further upstream volume grating can effect a necessary preliminary deflection should the geometric arrangement require so.

The thicker the volume grating the greater is its selective effect.

Diffraction processes at volume gratings have been described by Herwig Kogelnik in his Theory of coupled waves (H. Kogelnik, "Coupled Wave Theory for Thick Hologram Gratings", *Bell Syst. Techn. J.* 48 (1969) 2909-2947). A volume grating is considered thick if it has a Q factor $$Q = 2\pi d\lambda/(n_0 \Lambda^2)$$

that is greater than 10, where d is the thickness of the volume grating, $\lambda$ the working wavelength of the light in vacuum, $\Lambda$ the grating constant of the volume grating and $n_0$ the mean refractive power.

Instead of using a volume grating which is optimised for multiple angles of incidence and/or multiple wavelengths, multiple volume gratings with smaller range of functions can be combined in series, i.e. each volume grating deflects the light into a different direction or focuses it on a different point.

In addition to various exit angles, additional field lens functions can preferably be written to the volume grating during manufacture which limit the diameter of the visibility region in the observer plane.

Generally, angle division multiplexing allows different wave fields to be reconstructed. This corresponds with the principle of holographic reconstruction. This also allows field lenses with different focal lengths to be reconstructed. It can also be preferable to reconstruct plane waves which propagate into different directions, for example if there is a separate field lens.

Here, the foci of the field lenses which are generated by light distributions with different angles of incidence do not have to lie in the same plane as them. For example, light distributions with different vertical angles of incidence can generate a series of field lenses whose foci differ, for example, in the horizontal direction, in the horizontal and vertical direction or in the horizontal and vertical direction and in the focal plane.

To generate or support the function of a field lens, it is possible to divide the volume hologram into at least two sub-holograms which lie side by side and each of which satisfying for itself the Bragg condition with slightly different exit angle; i.e. the volume grating is divided into segments. The manufacture and working principle of such volume holograms as such is known, for example, from the German patents DE 19 700 162 B4 or DE 19 704 740 B4, the entire contents of both of which being fully incorporated herein by reference.

For selecting the individual directions which are written to the volume hologram there can be at least one horizontal and/or vertical displacing unit which controllably affects the light emitted by the light sources such that the angle of incidence and/or the point of incidence on the volume hologram are variable. This unit can here, for example, be part of the backlight unit for a transparent light modulator or part of a frontlight unit for a reflective light modulator. Here, the necessary displacement and/or tilt is set by the system controller based on the selected detected eye position. It can be realised in a known manner using mechanical, reflective, refractive or diffractive methods. If a flat illumination device is used, the input coupling angle into a plane waveguide can so be varied, for example.

Another preferred embodiment uses for each wavelength range, i.e. for example for the red, green and blue spectral range, multiple narrow-band light sources, which differ only slightly in their principal wavelength and which are chosen and activated selectively by the system controller in order to choose or to address the individual diffraction angles in the at least one volume grating. Such light sources can preferably be lasers, for example semiconductor lasers or narrow-band light-emitting diodes.

Here, the system controller can perform a colour correction of the information to be represented, depending on the selected narrow-band spectral ranges.

Both methods can be combined with each other, so that diffraction gratings for different angles of incidence and for different, closely neighboured wavelengths can be written to the at least one volume hologram.

In another embodiment, at least one polariser which is switched through the system controller is used in conjunction with at least one birefringent lens in the first light-affecting means for changing the beam direction in large steps. Such a system is known, for example, from document WO 03 015 424 A2 for 2D/3D switching in an autostereoscopic display, the entire contents being fully incorporated herein by reference.

Here, a birefringent material, for example a liquid crystal mix, is disposed between two interfaces of two transparent materials which serve as substrate. In this arrangement, at least one interface is curved so to realise the effect of a lens and/or partly inclined in respect to the other interface so to realise the effect of a wedge.

One out of two possible lens and/or deflection effects can be selected by choosing one out of two possible directions of polarisation by the switchable polariser. The strength of the lens effect and/or of the wedge angle can vary across the surface area of the deflection and/or focusing unit. It is further possible to provide the switchable polariser in a segmented form so to be able to select the two directions of polarisation locally differently.

The switchable polariser can, for example, be formed by a variable retardation plate with the help of an electrically controllable birefringent material, which can, for example, comprise a liquid crystal mix as well. Here, the birefringent material is embedded between two substrates which are fitted with suitable electrode structures. It is possible here again to connect multiple of those light-affecting elements in series in order to increase the total effect of the light-affecting means.

Switchable birefringent light-affecting elements can also be used instead of a switchable polariser and a static birefringent light-affecting element. In such a device, as has been proposed, for example, for 2D/3D switching in autostereoscopic displays in document WO 2007/007 285 A2, the entire contents of which being fully incorporated herein by reference, the number of required substrates can be reduced compared with the aforementioned solution. These light-affecting elements can also be segmented and/or arranged in series connection.

Thanks to suitable electrode structures, plane light-affecting elements can thus also be manufactured where by impressing suitable electric field distributions a controllable gradient index profile of the refractive index can be generated with which the direction of light propagation can be influenced.

In further embodiments, at least one polarisation grating is used to affect the light. Such a grating only generates the $-1^{st}$, $0^{th}$ and $+1^{st}$ diffraction order. Here, by using incident circular polarised light is its possible to deflect almost 100% of the light into the $+1^{st}$ or $-1^{st}$ diffraction order, depending on the direction of rotation of the circular polarisation.

Both actively switching polarisation gratings and passive polarisation gratings are known in the art. Polarisation gratings can be manufactured by way of aligning liquid crystals with adequately prepared surfaces. Such surfaces which serve as structured alignment layers for the liquid crystals can be generated, for example, by polymerising linear photo-polymerisable polymers (LPP). For this, the layers are formed, for example, with interference patterns of circular polarised ultraviolet light, e.g. as emitted by a UV laser.

Without or with only little voltage impressed on an electrode structure, the active polarisation gratings form a periodic grating structure and can deflect incident circular polarised light at high diffraction efficiency into the $+1^{st}$ or $-1^{st}$ diffraction order, depending on its direction of rotation. If the applied voltage is sufficiently high, the liquid crystals can be aligned such that the grating structure is destroyed, so that incident light passes through such a light-affecting element without being deflected, i.e. in the $0^{th}$ diffraction order.

Passive gratings can, for example, be made by way of polymerising liquid crystal polymers (LCP). Both active and passive polarisation gratings can be used in conjunction with a switchable polariser, for example with a switchable retardation plate, in order to select the desired diffraction order. In an active polarisation grating, the system controller controls both the switchable polariser and the controllable grating in order to select the desired direction of diffraction. In a passive grating, it is only the switchable polariser that is controlled for this. It is possible to connect multiple combinations of switchable polarisers and polarisation gratings as light-affecting means in series. The grating constant of the polarisation grating can be varied across the light entrance surface in order to achieve a locally different deflection effect. This variation can be continuous or segmented. This makes it possible, for example, to realise or to support the function of a field lens. It is also possible, for example, to implement cylindrical lenses or crossed cylindrical lenses.

In order to enable the system controller to select the actually suitable diffraction angle, the planar switchable polariser can also be of a structured design.

If the grating is used in conjunction with other light-deflecting elements, for example with an upstream field lens and/or other light-affecting elements, the grating must be optimised locally for a particular angle of light incidence. In an active polarisation grating, this can be done by way of local adaptation of the control voltage and thus of the effective birefringence.

In passive polarisation gratings, the hologram which is used during manufacture must show a local variation in the grating period.

In a simple polarisation grating, the deflection angle depends on the wavelength. In a colour display, where the individual colour components are generated by way of time division multiplexing, this angle difference must be compensated by the system controller using further controllable deflection elements.

Document WO 2008/130 561 A1, the entire contents of which being fully incorporated herein by reference, also discloses, for example, multiple layer systems of passive polarisation gratings, where the deflection angle remains almost constant across a wide spectral range.

In another embodiment, diffractive gratings whose grating period can be modified by changing the voltage impressed on a liquid crystal cell are used for rough light deflection. Such a system is described in U.S. Pat. No. 6,188,462 B1, for example, the entire contents of which being fully incorporated herein by reference. By varying the applied voltage across the surface of the grating, it is possible here too for the system controller to set a locally different deflection angle in a variable way.

Diffractive phase gratings of the kind provided to realise continuous deflection in the second light-affecting means can preferably be used for rough light deflection as well. In these gratings, the grating periods and thus the size of the deflection angle are set by impressing a saw-tooth-shaped voltage profile on a fine electrode structure, i.e. the control voltage rises from electrode to electrode from a base value to a peak value within a desired or specified grating period. Here, the peak value determines the maximum phase shift of the light which is modulated by the liquid crystal layer. Here, the voltage profile does not necessarily have to have a clear-cut saw-tooth shape, but should rather allow for the characteristic of the voltage-phase relation so to eventually achieve a saw-tooth-shaped phase profile. The smallest possible grating period, and thus the largest possible deflection angle, is defined by the electrode pitch. Since very fine grids with a pitch of few micrometers to several hundred nanometers are difficult to be controlled, in particular in large-area deflection gratings, it is possible to combine electrodes in the deflection grating for rough deflection and to address these groups of electrodes with a common signal if their distance is larger than that which corresponds with the grating period for the largest possible deflection angle in the deflection grating for fine deflection. The deflection grating for fine deflection can, for example, have an electrode pitch of several micrometers, with each electrode being addressed individually, whereas the deflection grating for rough deflection has an electrode pitch of less than one micrometer but where electrodes are combined over a width that is larger than the electrode pitch of the deflection grating for fine deflection.

Here, combining the electrodes can be segmented across the surface of the deflection grating. It is also possible to vary the electrode pitch across the surface of the grating, e.g. to provide a finer electrode grid near the edges of the grating so to realise a larger deflection angle which is required there.

Further light-deflecting elements can preferably be used in a transmissive or reflective mode for beam deflection of pencils of rays with small cross-section, as they are emitted by small light sources in the illumination device directly or after beam forming. Acousto-optic modulators (AOM), for example, allow beam deflection at high speed. Here, the deflection angle can be changed by varying the control frequency. The diffraction efficiency can be affected by varying the level of the control voltage. AOMs which comprise multiple sound converters which can be controlled with phase-shifted signals are also known. Thereby, the effective phase grating in the AOM can be inclined depending on the phase and thus be adapted to changing exit angles so that the Bragg condition is widely satisfied at the same angle of incidence in order to realise a high diffraction efficiency at a wide exit angle range and a wide working wavelength range. Such a modulator is known for example from document U.S. Pat. No. 5,576,880, the entire contents of which being fully incorporated herein by reference. Since an AOM only allows small deflection angles to be generated, the angular range can be extended by way of providing downstream a volume grating with multiple exit angles written to it or a respective volume grating stack comprising individual gratings with different exit angles at angles of incidence which differ only slightly. Such an arrangement is known for example from document U.S. Pat. No. 3,980,389, the entire contents of which being fully incorporated herein by reference.

All optical interfaces of the light-affecting means or light-affecting elements should preferably be fitted out with anti-reflection layers to prevent the occurrence of diffused light. They can have a broad or narrow spectral and/or angular bandwidth, as is known in the prior art, depending on the actual application.

Suitable apertures for filtering out diffused light and/or diffraction orders which are not used can be disposed in the optical path. Additional means for wave front forming, such as apodisation masks, can be used as well.

Further possible measures for optimising and specially adapting the method, including, for example, the use of look-up tables to allow fast computation of the control parameters for the deflection angles, the use of joint substrates in a multi-layer design of light-deflecting elements, measures for calibration, error correction, compensation of thermal effects, compensation of ageing effects or the design of the control circuitry and electrode structures shall be included in the present invention and will not be explained in more detail because such measures are apparent to a person who is skilled in the art and knows the teaching of the invention described above. All controllable components can also be designed to provide closed-loop control in conjunction with suitable additional sensing devices.

Other known light-deflecting elements than the mentioned electrically controllable diffraction gratings can be used as well for continuous observer tracking.

BRIEF DESCRIPTION OF THE DRAWINGS

Now, there are a number of possibilities for embodying and continuing the teachings of the present invention. To this end, reference is made on the one hand to the dependent claims that follow claim 1, and on the other hand to the description of the preferred embodiments of this invention below including the accompanying drawings. The Figures are schematic drawings, where

DETAILED DESCRIPTION OF THE INVENTION

Figure 1:
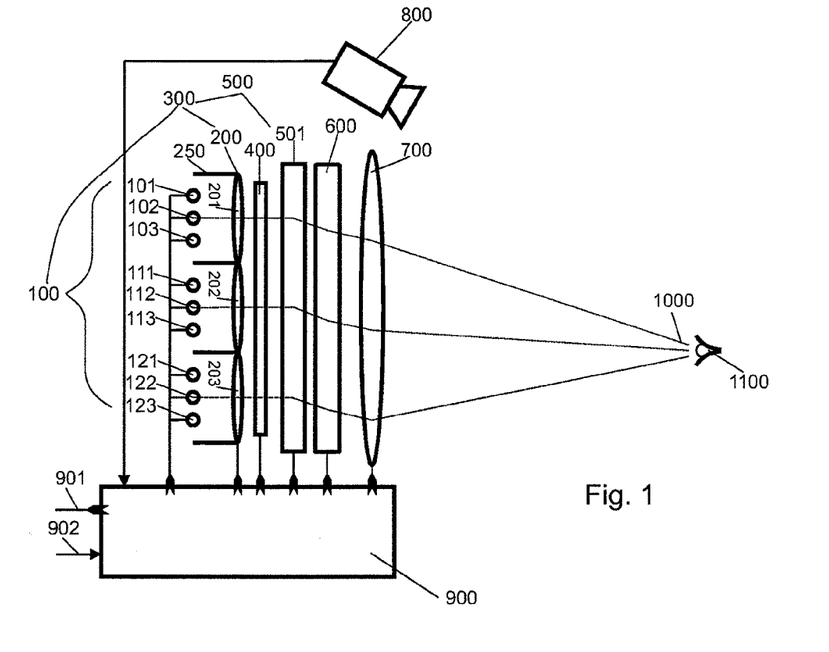
FIG. 1 shows a first embodiment of the invention.

FIG. 1 shows schematically a typical embodiment of a light modulator device. A light source 100, here a plane light source array, comprises a multitude of individual small light sources 101 to 123 which are switchable or whose brightness is controllable in an open or closed-loop control process individually or in groups through a system controller 900.

Here, each single light source 101 to 123 can also comprise multiple light sources with different principal wavelengths which are also be independently controllable. The light sources 101 to 123 illuminate a plane light modulator 400 through a collimation unit 200, which can comprise an array of individual lenses 201 to 203 or stripes of cylindrical lenses. The lenses 201 to 203 can also be of a controllable type, so that the focus is variably controllable in one, two or three dimensions by the system controller 900. The device can comprise an aperture stop 250 which prevents light emitted by one of the light sources 101 to 123 from passing through multiple lenses 201 to 203 of the collimation unit 200. This is of particular importance if the device is designed for multi-user operation. In the embodiment illustrated in FIG. 1, a transmissive light modulator 400 is used which modifies the amplitude and/or phase of the light in the plane. The combination of the controllable light source array 100 and the collimation unit 200 forms a dynamic illumination device 300.

The light modulator 400 receives its modulation values for the display of three-dimensional image information from the system controller 900, which computes these values based on input information of the 30 scene 902 and on position information of at least one eye position 1100 of at least one observer of the image information, said position information being provided by an eye position detection system 800. The system controller 900 allows for the characteristics of the light modulator 400 and takes into consideration further correction values which result from the specific design of the optical system and from the position information. The image information to be displayed, in particular the scene detail to be represented, can also be prepared outside of the system controller 900 based on the eye position information 901 which is made available by the system controller 900 to an external computing unit. The eye position detection system 800, which is known as such in the art, can comprise, for example, at least one camera and a corresponding signal processing unit, where the signal processing unit can also be part of the system controller 900. The signal processing unit finds the position of the eye pupils in the particular camera image and calculates the corresponding spatial coordinates of all observer eyes 1100. Other eye position detection systems 800, which work, for example, with ultrasound, or which use passive or active marks or signal sources which are associated with the observer can be used as well.

Further light-affecting means 501, which are controlled by the system controller 900, can be disposed in the optical path between the light sources 101 to 123 and the observer eyes 1100. In the illustrated embodiment, the dynamic illumination device 300—alone or in combination with the further light-affecting elements 501—forms the light-affecting means 500 for rough beam deflection. A second light-affecting means 600 is provided in the form of diffractive controllable deflection gratings, where said light-affecting means can also comprise multiple light-affecting elements, in order to direct the particular visibility region 1000 continuously or in fine steps at the particular observer eye as controlled by the system controller 900 based on the eye position information 901. Referring to the embodiment pictured in FIG. 1, a field lens 700 is provided for focusing the visibility region 1000 on the observer plane, where said field lens can also be designed in the form of a controllable adaptive lens which is controlled by the system controller 900 to adjust the size of the visibility region 1000 depending on the distance of the observer eyes 1100 from the light modulator 400. The function of the field lens 700 can, however, wholly or partly be integrated into the dynamic illumination device 300 and/or into further light-affecting elements 501 and/or into light-affecting elements of the second light-affecting means 600.

Figure 2:
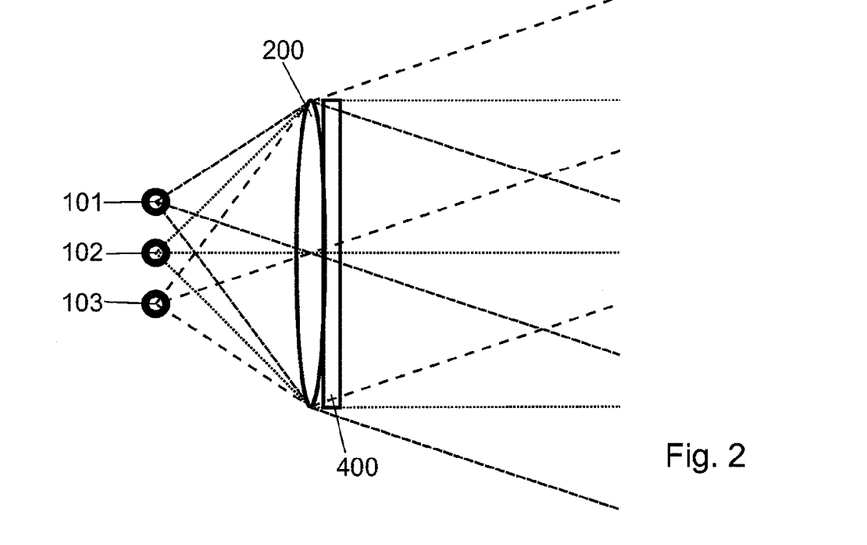
FIG. 2 shows a detail of a light-affecting means for observer tracking in large steps with the help of switchable light sources.

FIG. 2 shows schematically a detail of an illumination device which is designed such to serve as a light-affecting means for rough tracking of at least one visibility region to the position of at least one observer eye using switchable light sources 101 to 103.

A multitude of switchable or controllable light sources 101, 102, 103 are situated in front of a collimation unit 200, which can comprise refractive and/or diffractive elements. The desired direction of deflection is selected by switching on one of the exemplarily shown light sources 101, 102 or 103. The deflection angle depends on the distance of the light source to the optical axis OA of the segment of the collimation unit 200 and on its distance to the object-side principal plane of these image segments. In the illustrated embodiment, the light sources 101 to 103 are situated in the object-side focal plane, so that the light leaves the collimation unit 200 parallel. This light illuminates the light modulator 400.

Figure 3:
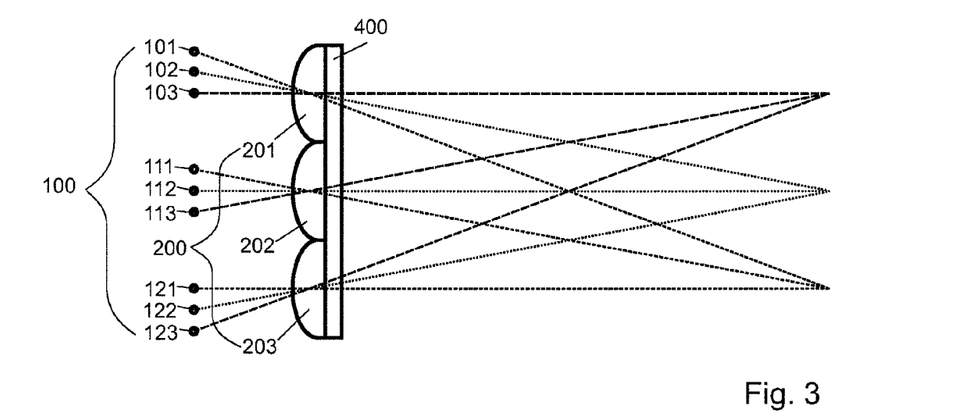
FIG. 3 shows a light-affecting means for observer tracking in large steps with the help of switchable light sources with additional field lens function.

FIG. 3 shows schematically an option for observer tracking in large steps with the help of switchable or controllable light sources 101 to 123 with additional field lens function. The individual light sources 101 to 123 of a light source 100 which is provided in the form of a plane light source array are arranged asymmetrically behind the collimation lenses 201 to 203 of a collimation unit 200, so that the light which is emitted by the light sources 101 to 123 and which passes through the light modulator 400 is deflected more strongly towards the centre of the observer region of the display device near the edges of the light modulator 400 than light which is emitted by light sources in the centre of the collimation unit 200. As shown here, the light sources 101 to 123 can be arranged outside the focal plane of the collimation lenses 201 to 203, so that they are imaged to the central observer plane.

The individual light sources 101 to 123 can be composed of individually switchable or controllable sub light sources with different spectral distributions of the emission characteristics. The individual sub light sources can be slightly staggered in depth, i.e. located at different positions in relation to the optical axis, so to compensate chromatic aberration of the collimation unit in order to allow all colour components to be imaged largely in the same central observer plane.

For this purpose, the refractive power of the collimation lenses 201 to 203 can, for example, be variably changeable by the system controller in order to compensate such chromatic aberration and to adjust the observer plane to the distance of the observer from the display device.

There are a number of further possibilities to realise the function of a field lens. The optical axes of the individual collimation lenses 201 to 203 could, for example, be inclined more strongly towards the edge of the lens array 200, so that, for example, all optical axes intersect in the centre of the observer region in the central observer plane. The light sources 101 to 123 which are assigned to a certain lens 201 to 203 can be disposed at an angle too.

Figure 4:
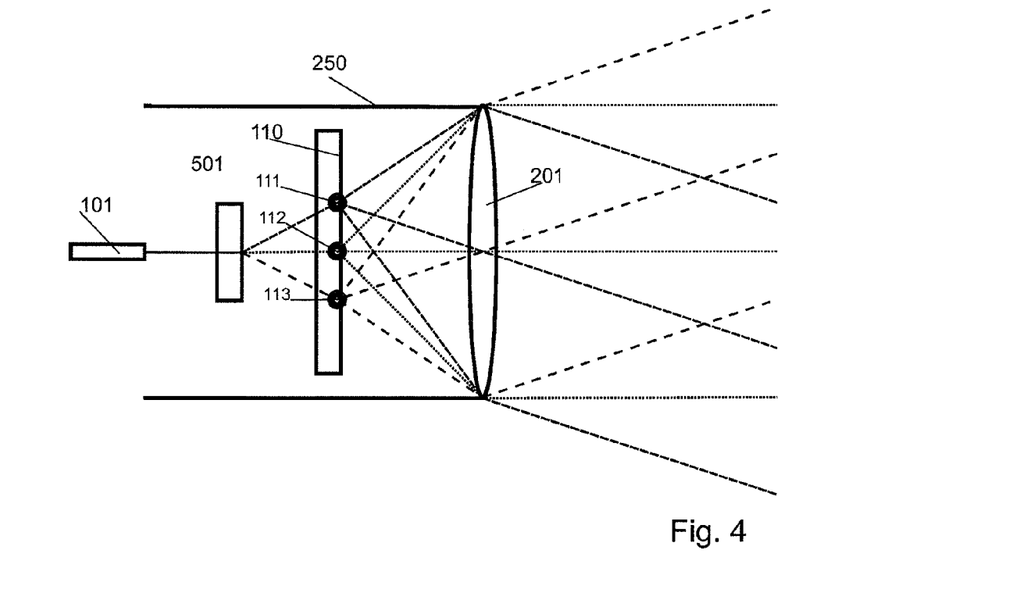
FIG. 4 shows a detail of a light-affecting means for observer tracking in large steps by way of light source displacement with the help of diffractive deflection gratings in the illumination device.

FIG. 4 shows the principle of the observer tracking using diffractive gratings with the example of a detail of an illumination device. A collimated light source 101 illuminates a switchable or controllable light-affecting element 501 for beam deflection, which can comprise, for example, at least one diffractive deflection grating. The latter deflects the beams of the collimated light source 101 to a different location on a diffusing plate 110, depending on the set deflection angle. The diffusion profile can be varied locally such that the following collimation lens 201, which can comprise, for example, diffractive and refractive elements, is illuminated as optimally as possible. The locally varied diffusion profile of the diffusing plate 110 can, for example, be generated holographically. The points of incidence of the pencils of light which are deflected by the light-affecting element 501 represent deflection-angle-dependent secondary light sources 111 to 113, which illuminate a region of the light modulator through the collimation lens 201 of a collimation unit, as shown in FIG. 2 or FIG. 3. The light source 101 can again comprise individually switchable sub light sources with different spectral distributions of the emission characteristics. The light-affecting element 500 can be composed of multiple deflection gratings in order to provide for a two-dimensional deflection, for example. Suitable aperture stops 250 can prevent light of unused diffraction orders, which can occur in the light-affecting element 501, or light of the secondary light sources 111 to 113 which does not fall on the collimation lens 201 from illuminating other collimation lenses of the collimation unit and from propagating though the illumination device as unwanted stray light.

Controllable diffractive gratings whose grating period can be controlled variably can preferably be used as deflection gratings in the light-affecting element 501.

Phase gratings which are based on liquid crystal cells can, for example, be used where variable grating periods and thus deflection angles are writable with a grid electrode structure.

Moreover, acouto-optic modulators can be used as well.

However, further embodiments are possible, including the use of active and passive polarisation gratings in conjunction with controllable retardation plates.

Since the distance between the light-affecting means 501 and the diffusing plates 110 can be chosen rather large, it is possible to use in the light-affecting means 501 deflection gratings which can only generate small deflection angles. Only low demands will thus be made on the required minimum grating period, which simplifies the manufacture of such deflection elements considerably.

The controllable grating can be illuminated at an angle in order to blank out undesired intensities in the zeroth diffraction order. In order to realise an optimum deflection range for each working wavelength, where said deflection ranges are largely overlapping, the grating can be illuminated at a different, adapted angle for each working wavelength range.

Instead of the deflection grating in the light-affecting element 501, other deflection elements can be used as well. Controllable electro-wetting cells can be used, for example, where the position of a meniscus or the position and shape of a meniscus as an interface of two liquids with different refractive index can be varied in one or two directions.

Figure 5:
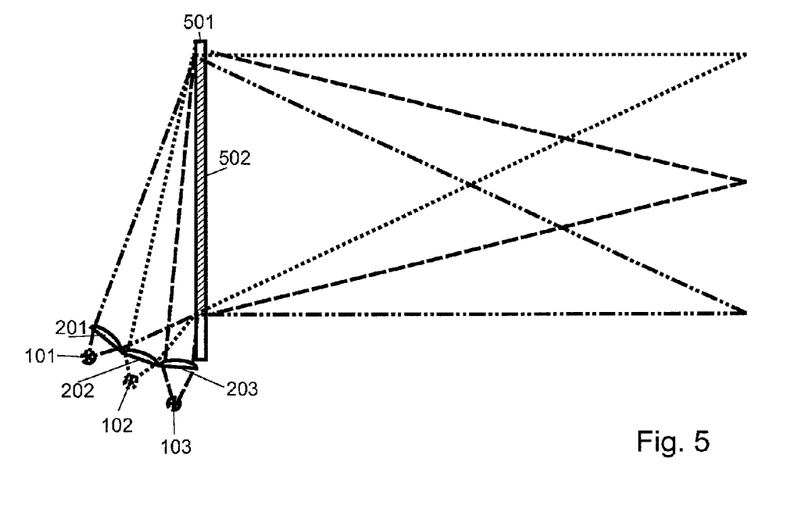
FIG. 5 shows a detail of an illumination device with a volume grating and angular multiplexing.

FIG. 5 shows schematically a detail of an illumination device with a volume grating and angular multiplexing of the light sources. The light-affecting element 501, which comprises at least one volume grating 502 for light affecting, is illuminated from slightly different directions by multiple light sources 101 to 103 through collimation lenses 201 to 203. Various reconstruction geometries are statically written to the volume grating 502 of the light-affecting element 501. If the volume grating is illuminated from different directions, different wave fronts are generated and emitted. The volume grating 502 of the light-affecting element 501, which can also comprise a stack of multiple volume gratings 502, can, for example, be illuminated at five angles with an increment of 0.3°, so that on its exit side five field-lens wave fronts are generated with an angle increment of 12°, for example.

Figure 6:
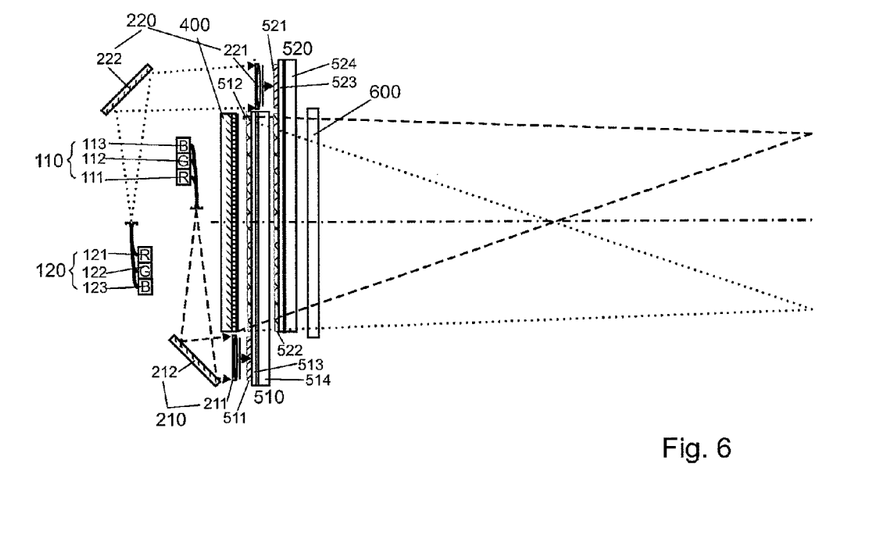
FIG. 6 shows a light modulator device with a reflective light modulator.

FIG. 6 shows schematically a light modulator device with a reflective light modulator 400 for image encoding in conjunction with a frontlight unit. The frontlight unit for illuminating the light modulator 400 with collimated light comprises a stack of plane light-deflecting elements 510, 520. Here, the corresponding deflection function can be selected by activating a light source 110, 120 which is assigned to the particular light-deflecting element 510, 520. In this embodiment, the light sources 110, 120 are each represented by a laser diode 111, 121 for the red spectral range, a laser diode 112, 122 for the green spectral range and a laser diode 113, 123 for the blue spectral range. The light which is emitted by these light sources 110, 120 passes accordingly assigned collimation units 210, 220 and is coupled into a plane waveguide 513, 523 through at least one volume grating 511, 521 each, where each combination of volume grating and plane waveguide is disposed on a joint substrate 514, 524. In this embodiment, a hologram each for the red, green and blue spectral range are written to each of the volume gratings 511, 521. In optically coherent applications, for example in a holographic display device, the plane waveguide 513, 523 should be chosen to be so thin that light can propagate under one reflection angle only (mono-mode light waveguide) in order to maintain the coherence of the light.

The light is coupled out of the plane waveguide 513, 523 through the accordingly assigned volume grating 512, 522 and directed in a collimated manner at the reflective light modulator 400. After being modulated by the reflective light modulator 400, the light of the selected light source 111 to 113, 121 to 123, is deflected by the corresponding volume grating 512, 522 into the desired direction or, as shown here in this embodiment, focused on the desired location in the observer plane. In this embodiment, holograms for each working wavelength of the light sources 110, 120 are written to the volume gratings 512, 522 too. These holograms are made such that a homogeneous luminous intensity is generated across the entire surface of the light modulator 400. For this, the diffraction efficiency must be the higher in the volume grating 512, 522 the farther the output coupling point is away from the corresponding input coupling grating 511, 521.

At least one additional light-deflecting element 600, which works continuously or in fine steps, ensures that, depending on the position of the observer, light can also be directed at eye positions which do not coincide with the fixed focusing points of the holograms which are written to the volume gratings holograms 512, 522. Here, the deflection element 600 can support the function of a field lens or fully take on this function. Alternatively, a separate field lens can be disposed, for example, between the light-deflecting element 600 and the observer.

Figure 7:
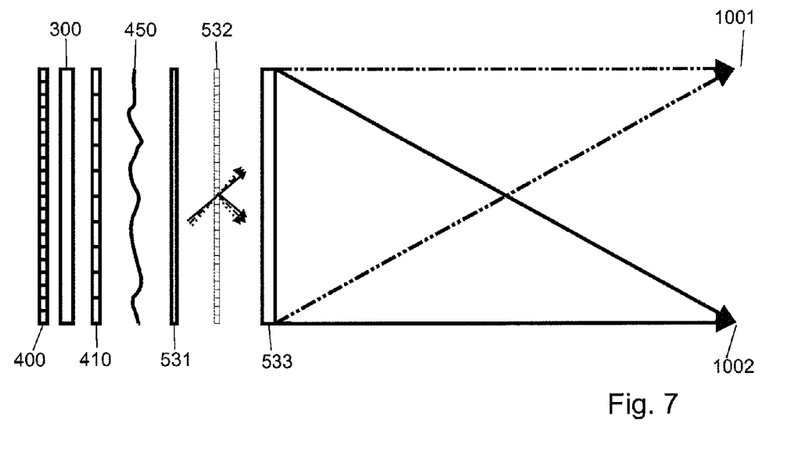
FIG. 7 illustrates the generation of two field lenses with the help of an active liquid crystal grating.

The collimation units 210, 220, which are assigned to the light sources 110, 120, can comprise passive and/or active optical elements 211, 212, 221, 222 for beam forming and beam direction changing, where said elements can affect the light reflectively, diffractively and refractively. Moreover, they can comprise scanning components, for example in order to illuminate the input coupling volume gratings 511, 521 in stripes. FIG. 7 shows schematically another embodiment of the invention. Here, one out of two field lenses which are written to a static volume grating 533 can be selected by a controllable volume grating 532 as controlled by a system controller (not shown in FIG. 7). A reflective phase-modulating light modulator 400, which is illuminated with collimated light by a frontlight unit 300, generates a modulated phase distribution which carries the image information to be represented. A spatially amplitude- and phase-modulated wave front 450 is generated by combining the light which has been modulated by neighbouring pixels of the phase-modulating light modulator 400 in a beam combiner 410, said wave front reconstructing the objects to be represented in the reconstruction space. Here, the object points can be reconstructed really between the observer and the light modulator 400 and virtually behind the light modulator 400. The modulated wave front 450 is deflected by a defined angle by the static volume grating 531 in order to generate a suitable or optimal angle of incidence for the following controllable volume grating 532. Here, the exit angles of the individual narrow-band wavelength ranges of the light sources of the frontlight unit 300 can differ slightly from each other. Depending on how the controllable volume grating 532 is controlled, the light passes through the latter without being diffracted or is diffracted by its grating structure into the first diffraction order. Said controllable volume grating 532 can be, for example, a polymer dispersed liquid crystal grating. Here, the desired diffraction pattern is created during manufacture by way of local polymerisation when a hologram is inscribed. Depending on the voltage impressed on the electrode structure, the refractive index difference among individual grating elements can be controlled in such gratings. If the voltage is chosen such that there is no refractive index difference, then the light will pass through the grating without being diffracted. The refractive index difference in the grating can be chosen by impressing a suitable voltage on the electrodes such that almost all light of the currently processed reconstruction wavelength range is diffracted into the first diffraction order.

A static volume grating 533, which can also be provided in the form of a multiplex volume grating, focuses the selected direction on the focal region 1001 or 1002, respectively. Here, the different angles of incidence for the individual wavelength ranges can also be allowed for, so that the focal regions of the individual colour components form a joint focal region.

It is also possible to vary the diffraction angles in the gratings 531 and/or 532 locally in order to get a suitable local angle of incidence for the volume grating 533 so that the required diffraction angle can be set in this grating at high diffraction efficiency. A segmented arrangement can be used here, too. This arrangement can also be applied to amplitude-modulating light modulators and complex-valued light modulators. Moreover, transmissive modulators can be used as well, then in conjunction with a backlight unit. In an autostereoscopic display, it is thus possible, for example, to switch between the focal points for the left and right observer eye. Typically, the arrangement is followed by a light-affecting means for continuous tracking of the foci to the observer position (not shown).

Figure 8:
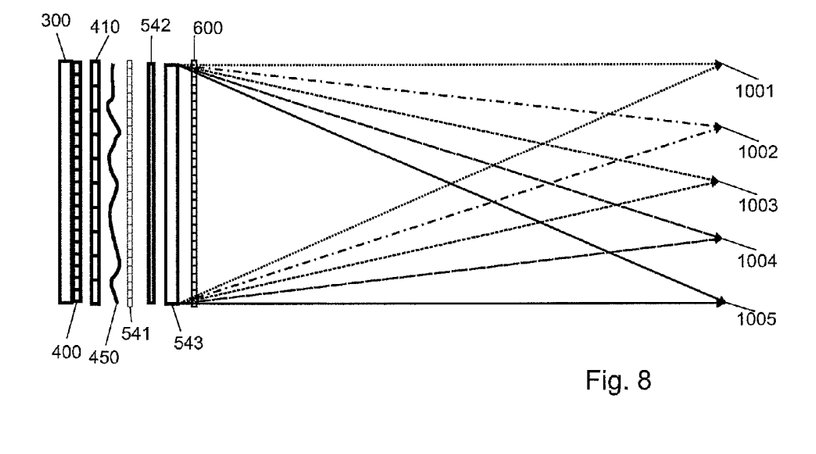
FIG. 8 shows a light modulator device with a transmissive light modulator and a liquid crystal phase grating with controllable grating period in conjunction with a multiplex field lens.

FIG. 8 shows schematically an embodiment of a light modulator device with at least one transmissive phase-modulating light modulator 400 for encoding image information in conjunction with a controllable liquid crystal phase grating 541. The light modulator 400 is illuminated with sufficiently coherent light by a backlight unit 300. After having been modulated by the light modulator 400, the light is formed into a spatially amplitude- and phase-modulated wave front 450 in at least one beam combiner 410. This wave front hits at least one controllable liquid crystal phase grating 541 for step-wise deflection of the wave front. For this, the liquid crystal phase grating 541 comprises a multitude of electrodes which can be addressed individually or in groups with a variable voltage profile. A Bragg grating is created in the liquid crystal grating by impressing a saw-tooth-shaped voltage profile with variable period lengths and variable voltage spikes on the electrode structure. Due to the saw-tooth-shaped phase profile which is thus generated by the grating, this grating acts as a blazed grating for the set direction of deflection if both grating period and phase shift are adapted to the currently processed working wavelength. As a consequence, the light of the wave front is diffracted into the desired direction of deflection at high diffraction efficiency.

Generally, the liquid crystal phase grating 541 can generate discrete or continuously variable angles for three wavelengths, for example.

In the following field lens, which can include a thin volume grating 542 and which comprises a thick volume grating 543, one of the focal regions 1001 to 1005 which are written to the thick volume grating 543 is selected by the deflection angle that is chosen by the liquid crystal phase grating 541. Here, the thin volume grating 542, if provided, diffracts the light which comes from the liquid crystal phase grating 541 such that for the at least one thick volume grating 543 an optimal or suitable angle of incidence is generated so that the light can be diffracted at high diffraction efficiency in the liquid crystal phase grating 541.

A light-affecting means 600, which comprises at least one finely structured diffractive liquid crystal phase grating, serves as a light-affecting means for tracking the selected focal region 1001 to 1005 continuously or in fine steps to the position of the selected observer eye as controlled by the system controller (not shown in FIG. 8). The visibility region from which the reconstruction can be viewed by the selected observer eye is thus generated.

Figure 9:
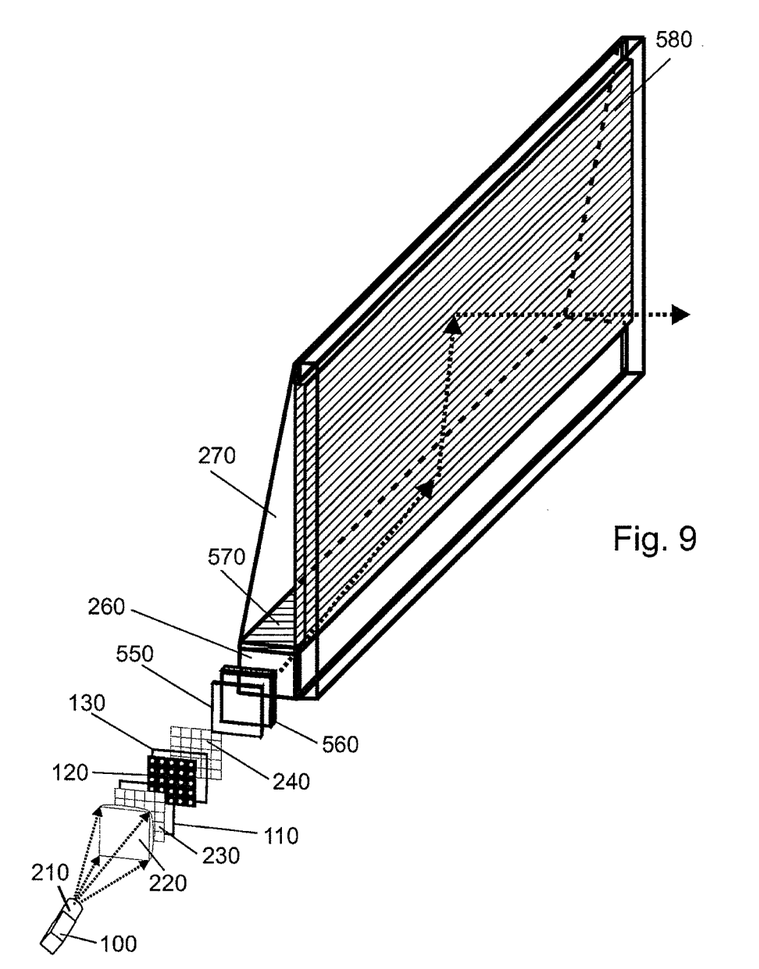
FIG. 9 shows a flat backlight device which allows vertical and horizontal displacement of the wave field which is generated by a collimation unit before it enters a first volume grating.

FIG. 9 shows schematically a light-affecting means for rough beam deflection, said light-affecting means being integrated into a flat backlight unit. A light source 100 illuminates a collimation unit 220 through a beam widening system 210. Here, the light source 100 can, for example, comprise an individually controllable laser diode each for the red, green and blue spectral range. The light which is collimated by the collimation unit 220 is directed at the apertures of an aperture stop 120 by corresponding lenses of a lens array 230. The apertures have the function of secondary light sources and the aperture stop thus forms a light source array. Further optical components 110 which serve to condition the light which is emitted by the light source 100 can be disposed in the optical path. At least one moving diffusing plate for reducing disturbing speckle effects can be disposed here, for example, which modulates the coherent laser radiation with a random phase. A light source array which comprises, for example, a multitude of laser diodes of the desired wavelength ranges can also be used instead of the single light source 100 and the aperture stop 120. The individual secondary light sources of the aperture stop 120 are collimated in another lens array 240 and illuminate a first light-affecting element 550 for beam deflection in the vertical direction. Further optical components 130 which serve to condition the light which is emitted by the secondary light sources 120 can again be disposed in the optical path. For example, at least one static or moving diffusing plate can be provided to limit the spatial coherence on the exit surface of the backlight to a suitable degree, so that, for example, multiple sub-holograms to be represented do not influence each other. A second light-affecting element 560 can affect the light in the horizontal direction. It is also possible that the light-affecting elements 550, 560 affect the light in another direction than the horizontal or vertical direction, or that they are arranged in a different order. Moreover, the light-affecting elements 550, 560 can be combined in one light-affecting element with a two-dimensional light-affecting effect. The light which is emitted by the light-affecting means 550 passes through a light waveguide 260 and illuminates a first volume grating 570. The latter directs the light through another light waveguide 270 at a second volume grating 580. Depending on the angular distribution of the light, with its selected wavelength distribution, generated in the controllable light-affecting elements 550, 560, the angular range desired for illuminating a light modulator (not shown here) is selected by the volume holograms which are written to the volume gratings 570 and 580. Here, the angular distribution by the light-affecting elements 550, 560 can be dimensioned such that the entire modulator surface is illuminated at a uniform brightness. The diffraction efficiency of the volume gratings 570, 580 can vary locally for this, as described above.

The light waveguides 260 and 270 should preferably be made of the same material, whose refractive power should differ as little as possible from that of the corresponding volume gratings 570 and 580, in order to avoid reflections at the interfaces. One or both light waveguides 260, 270 can also be of a wedge-shaped design. However, they can also be made of a different material, for example air. In this case, the interfaces may have to be treated with an anti-reflective coating.

The volume gratings 570 and 580 simultaneously effect an anamorphic enlargement of the illuminating wave field which is generated by the secondary light sources 120 and collimated by the lens array 240. It is thus possible to use small light-affecting elements 550, 560 for the selection of the hologram functions which are written to the volume gratings 570 and 580. They can be manufactured more easily and at lower costs than large-area arrangements. Moreover, small-area controllable deflection gratings can be designed to have a smaller grating constant, so that greater diffraction angles are generatable.

Further optical components, such as optical fibres or tilted mirrors can be disposed in the optical path between the light source 100 and the light waveguide 260, for example in order to allow a compact design of the entire system.

Figure 10A:
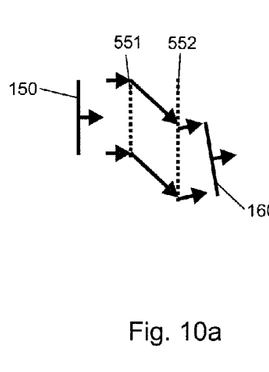
FIGS. 10a to 10c show exemplary effects of two controllable volume gratings as vertical light-affecting elements in FIG. 9.
Figure 10B:
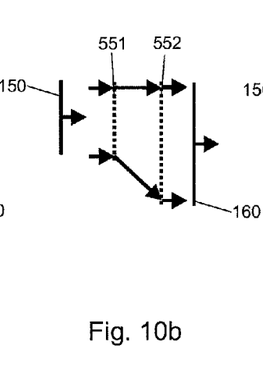
Figure 10C:
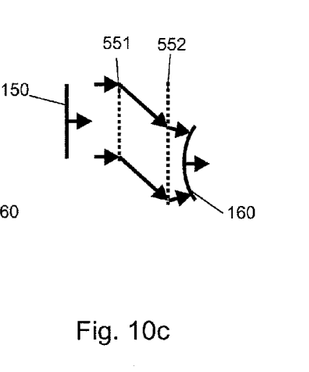

FIGS. 10a to 10c show schematically a possible arrangement and three possible effects of a light-affecting element from the embodiment that was illustrated in FIG. 9 with the example of the light-affecting element 550 for vertical deflection.

Two controllable liquid crystal gratings 551, 552, which are disposed immediately one after another, serve as a vertical displacing unit to affect the incident wave front 150 and to transform it into an exit wave front 160.

In the example that is illustrated in FIG. 10a, the two controllable liquid crystal phase gratings 551 and 552 generate both a vertical displacement and a change in the angle of the direction of propagation of the wave field 150.

The example which is illustrated in FIG. 10b demonstrates an expansion and displacement of the centre of the wave field 150.

The example which is illustrated in FIG. 10c shows a displacement and locally varying change in the exit angle of the wave field 150.

Figure 11:
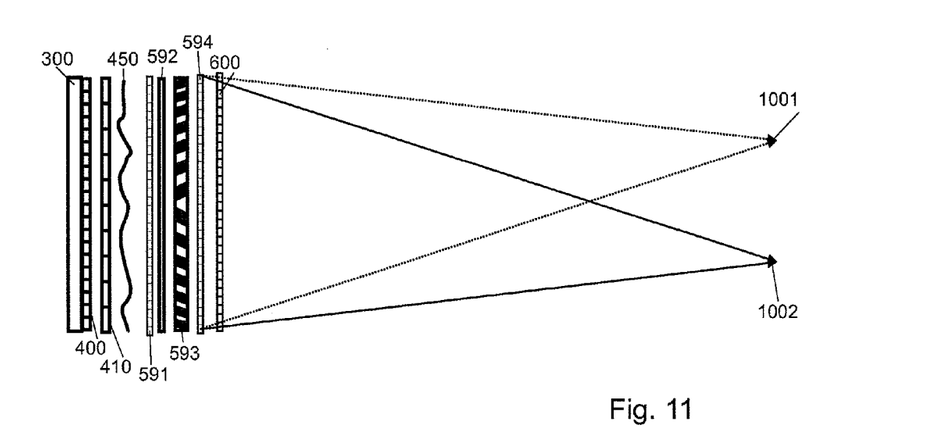
FIG. 11 shows a light modulator device with a transmissive light modulator and a polarisation grating in conjunction with a switchable polariser.

FIG. 11 shows schematically an embodiment of a light modulator device where the visibility region for the reconstruction of the 3D scene is tracked in large steps to the observer eye positions with the help of a passive polarisation grating in conjunction with active polarisation-modifying light-affecting elements.

A phase-modulating light modulator 400, which is illuminated with sufficiently coherent light by a backlight unit 300, and on which the scene to be reconstructed is encoded, generates together with a beam combiner 410 a spatially amplitude- and phase-modulated wave front 450. The light of the wave front 450 is given a left-handed or right-handed circular polarisation by a switchable or controllable polariser 591, which is provided, for example, in the form of a switchable or controllable retardation plate, and is directed at the following polarisation grating 593. The polarisation grating 593 diffracts the light—depending on the polarisation direction—to the $+1^{st}$ or $-1^{st}$ diffraction order, respectively, at high diffraction efficiency. Here, a volume hologram 592 is disposed between the switchable polariser 591 and the polarisation grating 593, said volume hologram 592 diffracting the light which passes through the switchable or controllable polarisation-modifying element locally into a direction which corresponds with a suitable angle of incidence for the polarisation grating 593.

A polarisation-modifying element 594, which can also be of a switchable or controllable type, can be disposed behind the polarisation grating 593 in order to suppress light which is not deflected into the desired diffraction order.

A following light-affecting means 600 for deflecting the light continuously or in fine steps directs the light of the modulated wave front 450 at the eyes of the observer, so that the latter can watch the reconstructed 3D scene.

The arrangement can comprise further passive or active polarisation-modifying elements which set the required polarisation direction for following polarisation-dependent elements or to transform linear polarised light into circular polarised light or vice versa.

The embodiment has a passive polarisation grating 593 whose grating period varies locally continuously or in steps. This makes it possible, for example, to realise the function of a field lens. If the light-affecting means 600 is in its neutral position, the light of the wave front 450 is directed at one of the two visibility regions 1001 or 1002, depending on the status of the switchable or controllable polarisation-affecting elements 591 or 594.

One or both switchable or controllable polarisation-affecting elements 591 or 594 can also be structured locally and switchable or controllable separately in one or two directions in order to compensate effects caused by the passage angle and/or of the wavelength range of the currently transmitted light.

Polarisation gratings 593 with uniform grating constant can be used too. They deflect the light of the modulated wave front 450 into one out of two directions, which are defined by the $+1^{st}$ and $-1^{st}$ diffraction order, respectively, depending on the status of the polarisation-modifying element 591. The function of a field lens can then be realised by additional passive and/or active optical elements, for example volume gratings.

In stacks which comprise locally controllable polarisation-modifying elements 591, 594 and passive polarisation gratings 593, the effect the deflection angle of the elements 591, 593, 594 of stack layers which are disposed more upstream in the optical path has on the polarisation change in the respective polarisation-modifying element 591, 594 can be compensated in a wavelength-specific manner through these locally controllable polarisation-modifying elements 591, 594. Polarisation-modifying elements 594, 591 which are disposed one after another and which belong to different neighbouring stack layers can also be combined so to form a joint controllable polarisation-modifying element.

Such stacks can be used to generate more than two focal regions or directions of deflection. The polarisation gratings 593 in the stack layers preferably have different grating constants at the same horizontal and vertical position, thus generating different diffraction angles there, in order to realise steps that are as uniform and fine as possible so to prevent double focal regions.

The number of layers in such a stack can be kept small by using polarisation gratings 593 with controllable grating period.

With switchable polarisation gratings 593, the zeroth diffraction order can be used as well.

Polarisation gratings 593 which exhibit a diffraction efficiency of almost 100% through a wide wavelength range can be manufactured by finding a suitable combination of the layer thickness, and thus of the optical retardation, and the twisting angle of the liquid crystal molecules. However, it is also possible to use stacks of switchable polarisation gratings 593 with each element being optimised for a different wavelength range.

In colour division multiplex mode, it is then possible to only activate the grating which is optimised for the currently processed spectral range.

A complex-valued light modulator can be used as an alternative to a phase-modulating light modulator 400 and a beam combiner 410. Further, it is possible to use a reflective light modulator in conjunction with a frontlight unit.

In the mentioned embodiments, it is also possible to use light modulators which generate the hologram through a scanning device or to use multiple light modulators. Moreover, a holographic or autostereoscopic display can also comprise multiple separate light modulator devices which jointly reconstruct a 30 scene or which jointly generate a stereoscopic image.

In all embodiments, all active components can be controlled by a system controller based on observer eye position information which is determined by an eye position detection system, while aberrations of optical components, thermal effects, local deviations of the wave front form caused by brightness fluctuations in the illumination device 300 and modulation errors in the light modulator 400, for example, can be widely allowed for and compensated. If necessary, such aberrations can be quantified in calibration measurements or found actively in real-time measurements.

Finally, it must be said that the embodiments described above shall solely be understood to illustrate the claimed teaching, but that the claimed teaching is not limited to these embodiments.

We claim:

1. A light modulator device for a holographic or an autostereoscopic display for the representation of three-dimensional image information, the light modulator device comprising:
   at least one real or virtual light source;
   a first and a second light-affecting means;
   an eye position detection system; and
   a system controller;
      wherein encoded image information of an image to be represented to at least one observer eye of at least one observer is written to at least one light modulator;
      wherein the first and the second light-affecting means is adapted to change the optical path of the light which is emitted by the light source;
      wherein the eye position detection system is adapted to find and to follow at least one eye position of the at least one observer of the image information and the system controller is adapted to track at least one visibility region of the image information based on eye position information provided by the eye position detection system using the first and second light-affecting means;
      wherein the first light-affecting means tracks the visibility region to the eyes of the observer only in large steps within an observer range and the second light-affecting means tracks the visibility region to the eyes of the observer finely graduated or continuously at least within one such large step of the first light-affecting means; and
      wherein the first and/or the second light-affecting means is adapted to change the direction of the light beam and/or the position of the light source, where the position of the light source is adjustable in one, two or three dimensions and where the direction of the light beam is adjustable in the horizontal and/or vertical direction.

2. The light modulator device according to claim 1, wherein the second light-affecting means is disposed in front of or behind the first light-affecting means in the direction of light propagation and that the first and/or second light-affecting means are disposed in front of or behind the light modulator.

3. The light modulator device according to claim 1, wherein the first light-affecting means is adapted to accomplish the finely graduated or continuous tracking of the visibility region to the eyes of the observer with the help of at least one electrically controllable diffraction grating.

4. The light modulator device according to claim 1, wherein the first and/or the second light-affecting means are composed of multiple light-affecting elements with which the beam direction and/or the position of the light source are changeable independent of each other.

5. The light modulator device according to claim 1, wherein the extent of the position change of the light source and/or the extent of the beam direction change in the first and/or second light-affecting means is variable depending on the point of incidence of the light on the surface area of the light-affecting means, so that—in addition to the tracking function—the function of a field lens with static or variable focal length is realisable or that the function of such a field lens is supported.

6. The light modulator device according to claim 1, wherein the position change of at least one light source is realisable in the first light-affecting means by mechanically moving the at least one light source and/or by modulating the intensity of multiple light sources at different positions.

7. The light modulator device according to claim 1, wherein at least one first light-affecting means is provided which affects light diffractively and/or refractively.

8. The light modulator device according to claim 1, wherein at least one first light-affecting means comprises one or multiple consecutive switchable diffractive gratings with a static or locally variable grating period.

9. The light modulator device according to claim 1, wherein the first light-affecting means includes a device for changing the positions of the light sources and/or their emission directions and that the first light-affecting means comprises at least one volume hologram to which at least two angle-selective diffraction angles and/or field lens functions are written, which are selectable by changing the direction of light incidence.

10. The light modulator device according to claim 9, wherein at least one horizontal and/or vertical displacing unit and/or a tilting unit are disposed between at least one light source and at least one volume hologram, said units controllably affecting the light which is emitted by the light source such that the angle of incidence and/or the point of incidence on the volume hologram are changeable.

11. The light modulator device according to claim 1, wherein at least one real or virtual light source is provided which illuminates the first light-affecting means switchably with at least two narrow-band wavelength ranges which are close to each other and that the first light-affecting means further comprises at least one volume hologram to which at least two wavelength-selective diffraction angles and/or field lens functions are written which are associated with those two wavelength ranges and which are selectable by changing the wavelengths of the light sources.

12. The light modulator device according to claim 9, wherein the first light-affecting means includes at least one volume hologram to which at least two angle-selective and at least two wavelength-selective diffraction angles and/or field lens functions are written.

13. The light modulator device according to claim 9, wherein at least one of the volume holograms of the first light-affecting means comprises at least two volume holograms arranged one after another which are matched to different angles of incidence and/or wavelength ranges in order to deflect light in different directions and/or to focus it on different positions.

14. The light modulator device according to claim 1, wherein the first light-affecting means comprises at least one switchable retardation plate and at least one birefringent lens in order to change the direction of the light beam.

15. The light modulator device according to claim 14, wherein at least one birefringent lens is a liquid crystal lens.

16. The light modulator device according to claim 14, wherein at least one birefringent polarisation grating is provided which has a grating period that is static or that varies across the surface of the polarisation grating in order to change the direction of the light beam.

17. The light modulator device according to claim 1, wherein the first light-affecting means includes at least one birefringent polarisation grating which has a switchable grating period that is static or that varies across the surface of the polarisation grating in order to change the direction of the light beam.

18. The light modulator device according to claim 17, wherein at least one birefringent switchable polarisation grating is provided which is optimised for light incidence at an angle and/or which has achromatic properties and which is optimised for at least two wavelengths.

19. The light modulator device according to claim 1, wherein the second light-affecting means includes at least one variable diffractive grating with which the beam direction changes are settable by way of controllably continuously or locally variably changing a grating period of the diffractive grating.

20. The light modulator device according to claim 19, wherein at least one of the variable diffractive gratings comprises a liquid crystal layer whose locally static or variable grating period is changed by impressing a voltage profile on an electrode structure.

* * * * *